Feb. 5, 1957 J. VAN BLADEL 2,780,726

AUTOMATIC-FREQUENCY-CORRECTION DEVICE

Filed March 10, 1953

Inventor: Jean Van Bladel

By Fred M. Vogel Agent

United States Patent Office 2,780,726

Patented Feb. 5, 1957

2,780,726

AUTOMATIC-FREQUENCY-CORRECTION DEVICE

Jean Van Bladel, Brussels, Belgium, assignor to Hartford National Bank and Trust Company, Hartford, Conn., as trustee Application March 10, 1953, Serial No. 341,549

Claims priority, application Belgium March 18, 1952

3 Claims. (Cl. 250—36)

Figures 1, 2:
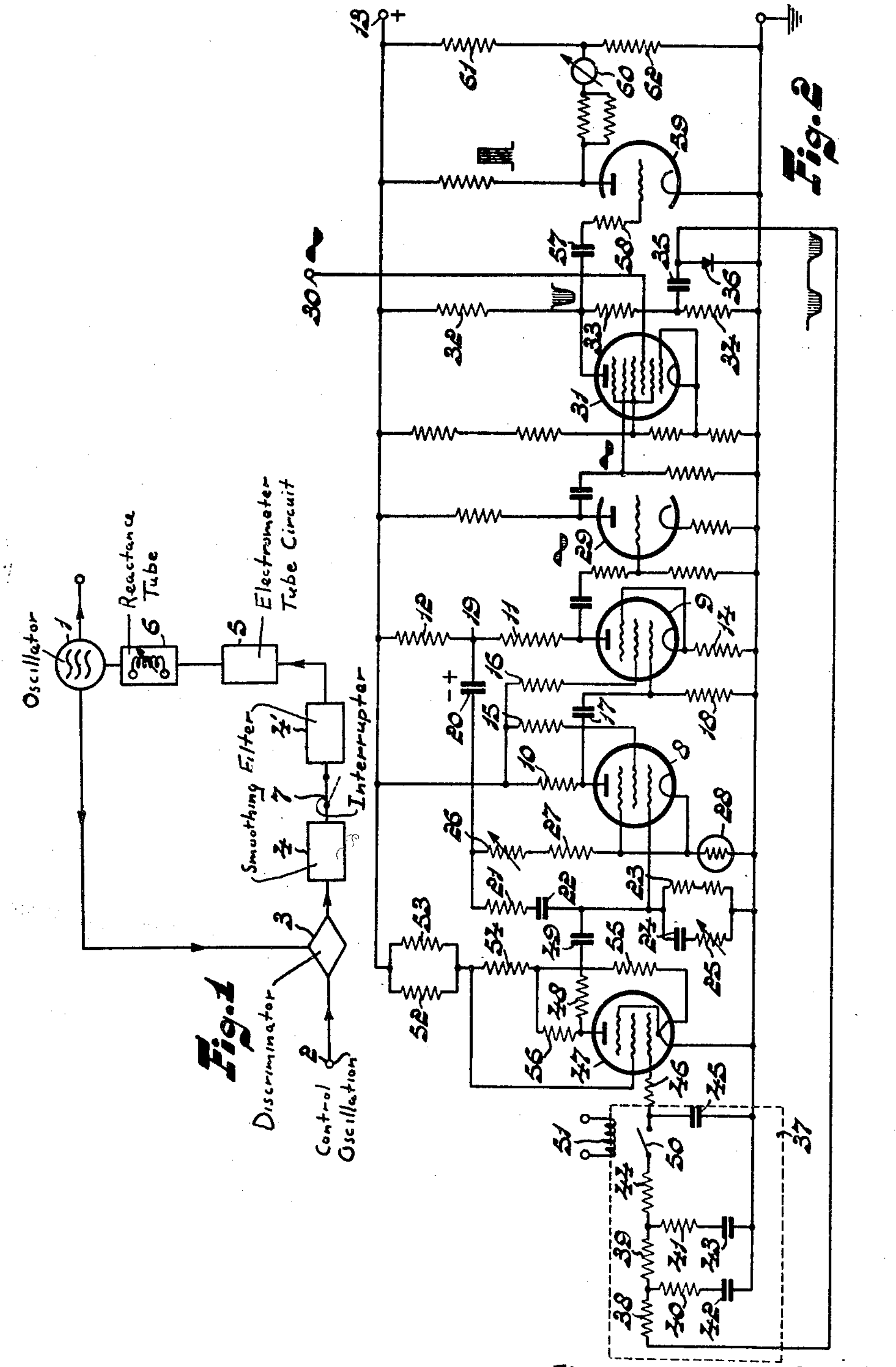

The present invention relates to a circuit arrangement for automatic frequency correction of an oscillator. More particularly, this invention relates to an arrangement for automatic frequency correction of an oscillator, in which a control-voltage obtained with the aid of a discriminator circuit controls a frequency corrector coupled to the oscillator via a smoothing filter comprising an output capacitor. The invention relates, more particularly, to an automatic-frequency-correction (A. F. C.) circuit of the kind in which between the output capacitor of the smoothing filter and the discriminator circuit provision is made of an interrupter, which is opened in order to maintain the oscillator frequency of the moment, irrespective of variations in the output voltage of the discriminator circuit.

In circuit arrangements of the aforesaid kind it is desired, in practice, to cause the oscillator to oscillate for an appreciable time (for example, for a few minutes or a few tens of minutes), after the interrupter has been opened, the frequency being the momentary oscillator frequency at the instant of interruption. In this case, in accordance with the use of the arrangement, the variation in frequency, or even in phase, relative to the oscillations of the oscillator at the instant of interruption must be smaller than that occurring in the known A. F. C. circuits of the present kind.

The invention has for its object to provide an A. F. C. device, which may largely fulfill the requirements stated in the preceding paragraph in a manner particularly simple in practice.

According to the invention, for this purpose the output terminals of the smoothing filter are connected to the control-grid circuit of an electrometer tube circuit.

The electrometer tube circuit preferably comprises an amplifying tube having a screen-grid, the operational voltages of which are such that the negative grid current is not more than $10^{-10}$ amperes, and the anode voltage and the screen-grid voltage of which are not more than 15 volts.

In order that the invention may be readily carried into effect, it will now be described in detail with reference to the accompanying drawing, wherein:

Fig. 1 is a schematic diagram of an embodiment of the circuit arrangement of the present invention; and Fig. 2 is a circuit diagram of an embodiment of the circuit arrangement of the present invention.

In Fig. 1, according to the invention, reference numeral 1 designates an oscillator, the frequency and phase of which are stabilized relatively to a control-oscillation applied to terminal 2. The control-oscillation and the oscillations produced by the oscillator are supplied, for this purpose, to a discriminator circuit 3, constituted by a phase detector, which supplies a control-voltage which is fed to a smoothing filter comprising two filter sections 4 and 4'. The A. F. C. control-voltage across the output capacitor of the filter section 4' controls frequency controlling or determining means such as a reactance tube 6, via a stage 5 (to be described more fully hereinafter), which tube may, for example, be connected in parallel with the frequency-determining circuit of the oscillator 1. The arrangement 1, 2, 3, 4, 4', 6 is of a kind known per se and need not be further explained.

In the embodiment shown an interrupter 7 is provided between the filter sections 4 and 4'; this interrupter can be opened in order to maintain a momentary oscillator frequency, irrespective of variations in the output voltage of the discriminator circuit 3. In the open position of the interrupter 7, shown in Fig. 1 by a broken line, the charge of the output capacitor of the filter section 4' constitutes an A. F. C. control-voltage for the reactance tube 6, independent of the output voltage of the discriminator 3. The charge of the capacitor, and hence also the corrected oscillator frequency, in known circuit arrangements varies due to leakage currents; the velocity of variation in the capacitor charge varies with the time constant of the capacitor circuit, which may, for example, be 10 to 20 seconds, if the operation is carried out carefully.

According to the invention the variation in the charge of the capacitor may be substantially avoided by connecting the output terminals of the filter section 4' to the control-grid circuit of an electrometer tube circuit 5, which constitutes a pre-amplifying stage preceding the reactance tube in the embodiment shown.

In this circuit-arrangement the variation in the charge of the capacitor depends primarily on two factors, i. e. the grid current passing through the control-grid circuit of the electrometer tube circuit and the leak resistor of the capacitor used. The effect of the last-mentioned factor need not be explained more fully; it may be reduced to a very small value by using capacitors of good quality, for example, of the type "Dubilier Nitrogol."

When an electrometer tube circuit is utilized the occurrence of grid currents, due to ionization, deposit of the residual gases in the tube, secondary-electron emission at the tube electrodes, photo-emission, ion emission at the cathode and the like in the case of a normal tube arrangement, is greatly reduced to values of less than $10^{-10}$ amperes (cf. the book "National Nuclear Energy Series," Manhattan Projects, Technical Section, Division V, vol. 1, Electronics Experimental Techniques, by W. C. Elmore and M. Sands, pages 180 to 187; McGraw-Hill Publishing Company, first edition). The charge of the capacitor is substantially not affected by this excessively low grid current or, in other terms, a very high effective time constant may be obtained for the capacitor circuit, if the interrupter or switch 7 is opened. Thus a variation in the oscillator frequency, due to a variation in the charge of the capacitor, is substantially avoided. Even in the embodiment shown, in which a phase detector is used as a discriminator, it is possible for the phase relationship between the oscillator oscillations and the control-oscillation to be maintained for an appreciable time after the switch 7 has been opened.

For the electrometer tube circuit use may be made of special electrometer tubes, but, as an alternative, for this purpose certain types of the standard radio-receiving tubes may be used; for example, Philips type DL 72 or DL 92. These radio-receiving tubes are used with greatly reduced supply voltages, i. e. with anode voltages and screen-grid voltages of not more than 15 volts. The filament current of the directly heated cathode for direct current must be considerably reduced, for example, to 50 to 70% of the normal operational value.

With the special electrometer tubes, for example, Philips type 4060, 4065, 4066, slightly higher supply voltages for the anode and the screen-grid are sometimes permissible, for example voltages of 25 to 30 volts.

With the use of the tubes referred to negative grid currents of not more than $10^{-12}$ to $10^{-13}$ amperes may be readily obtained in practice. It should be noted that without the use of a capacitor of excellent quality and with a simple construction of the electrometer tube arrangement, effective time constants of a few hours may be obtained in practice.

Fig. 2 is a circuit diagram of an embodiment of the invention. This embodiment is assumed to be used more particularly for studying the phase variation, in this case, phase fluctuations in the alternating supply line voltage in a high-current power station after the occurrence of a disturbance, due for example, to short-circuit. In Fig. 2 relatively crosswise coupled pentodes 8 and 9, which are connected via an anode resistor 10 and a series combination of resistors 11 and 12 respectively to a positive terminal 13 of an anode voltage battery, constitute an RC-oscillator of a kind known per se. The cathode of the pentode 9 is connected to ground via a cathode resistor 14 and the screen-grid voltages of the tubes 8 and 9 are derived from screen-grid resistors 15 and 16. The anode of the pentode 8 is connected via a blocking capacitor 17 and a grid leak resistor 18 to the control-grid of the pentode 9. A junction 19 of the anode resistors 11 and 12 is connected via a blocking capacitor 20 and the series combination of a resistor 21 and a capacitor 22 to the control-grid of the pentode 8, which is connected to ground through a series combination of a capacitor 24 and a variable resistor 25, shunted by a resistor 23. In order to improve the frequency stability of the RC-oscillator 8, 9 described so far, a negative feed back voltage is supplied to the cathode of the tube 8. The feedback voltage is derived from a potentiometer, connected in parallel with the branch 21—25; this potentiometer comprising the series combination of a variable resistor 26, a resistor 27 and a voltage-dependent resistor 28, constituted by a filament current lamp.

The frequency of the sine oscillations produced by the oscillator 8, 9, which is determined primarily, as is known, by the elements of the branch 21—25, is adjusted to a value which is lower than the normal supply line voltage frequency cycles per second.

In the embodiment shown, the frequency and the phase of the oscillator voltage are stabilized on the supply line voltage. For this purpose the oscillator voltage derived from the anode resistors 11, 12 of the RC-oscillator is supplied, subsequent to amplification and phase reversal in an amplifying stage 29, together with the supply line voltage from a terminal 30, to a phase detector constituted by a normally cut-off hexode mixing tube 31. In the phase detector shown the hexode tube 31 is released only if the oscillations originating from the oscillator 8, 9 and the supply line voltages have simultaneously positive polarity, and the amplitudes of these two voltages are chosen to be so high that amplitude limitation occurs. Thus a control-voltage is produced across an output resistor 32 of the tube 31. This control voltage has the shape of trapezoidal pulses of negative polarity; the duration of the large trapezium bases being substantially proportional to the absolute value of the phase difference between the oscillator voltage and the supply line voltage.

In the embodiment shown, the pulsatory discriminator voltage is supplied via a potentiometer 33, 34, connected to the anode resistor 32, and through a rectifying circuit 35, 36, to a low-pass filter 37, suppressing the pulse recurrence frequency and comprising the series combination of three sections. The first and second filter sections each comprise a series resistor 38 and 39 respectively and a parallel impedance constituted by the series combination of a resistor 40 and 41 respectively and a capacitor 42 and 43 respectively. The third filter section is constituted by a series resistor 44 and a parallel capacitor 45. The parallel resistors 40 and 41 serve to improve the control stability, more particularly, to restrict an "over-shoot." Across the output capacitor 45 of the low pass filter 37 occurs a smoothed A. F. C. control-voltage, which is supplied via a series resistor 46 to the control-grid of a pentode 47, connected as a frequency corrector, in an electrometer tube arrangement. The anode-cathode discharge path of the pentode 47 constitutes a variable resistor varying with the control-voltage supplied to the control-grid and connected through a resistor 48 and a blocking capacitor 49, in parallel with the network 23 to 25 of the frequency-determining circuit 21 to 25; of the oscillator 8, 9.

The frequency-corrector arrangement is controlled by the A. F. C. control-voltage in a manner such that synchronism occurs between the supply line voltage and the oscillations produced by the oscillator 8, 9. However, a phase displacement, the value of which varies with the value of the required frequency correction, remains between the two synchronized oscillations.

In order to maintain a momentary oscillator frequency, irrespective of variations in the output of the discriminator circuit, an interrupter 50 is provided between the junction of the series resistor 44 and the output capacitor 45 of the smoothing filter 37. The interrupter 50 forms part of a relay 51.

In order to avoid a variation in the voltage of the output capacitor 45 and hence in the frequency, and, in the present case, in the phase of the oscillator 8, 9, when the interrupter 50 is opened, the pentode 47, operating as a frequency corrector, is used in the electrometer tube arrangement. The supply-voltages of the pentode 47 are derived from a potentiometer comprising the series combination of two parallel-connected resistors 52 and 53, a resistor 54 and a resistor 55. This series combination is connected on the one hand to the positive terminal 13 of the anode voltage supply and on the other hand to ground via the filament current circuit of the pentode 47. The junction of the parallel-connected resistors 52 and 53 and the resistor 54 is connected to the screen-grid of the pentode 47 and the junction of the resistors 54 and 55 is connected through a resistor 56 to the anode of the pentode 47. In this circuit-arrangement the resistors of the potentiometer are so proportioned that the anode voltage and the screen-grid voltage are 9 and 14 volts respectively, while the filament current of the directly heated cathode, which is normally for example, 50 milliamperes, is reduced to 30 mA.

At the instant when the interrupter 50 is opened, owing to a disturbance in the supply lines, a certain phase displacement is produced between the oscillator voltage and the supply line voltage. For a certain period of time thereafter, it is desired that the oscillator go on oscillating, as if the connection with the undisturbed supply lines were not interrupted, in order to permit the utilization of the oscillator oscillations to make known the phase variation of the supply line voltage in case of the disturbance. The phase variation can be readily detected by connecting the anode circuit of the phase detector 31 via a blocking capacitor 57 and a series resistor 58 to the control-grid of an amplifying tube 59, connected as a limiting device, and then by connecting a differential indicating instrument 60 to the output circuit of amplifying tube 59. The differential instrument 60 is controlled by a comparison voltage from a potentiometer 61, 62, connected to the positive terminal of the anode supply source. In order to study the phase variation, in this case, phase fluctuations of the supply line voltage after a disturbance has occurred in the supply lines, the interrupter 50 is opened. After this the duration of the output pulses of the phase detector 31 constitute a measure for the phase variations, which may be followed and read on the differential instrument 60. The phase variation to be measured in practice may be a multiple of 1 cycle per second, hence a multiple of 360 degrees, during the first five seconds.

In the arrangement of Fig. 2, in operation, a phase variation of less than 10 degrees occurred owing to variations in the charge of the capacitor during the subsequent five seconds after the interrupter had been opened.

Operable component values for the circuit arrangement of Fig. 2 may be as follows.

The anode voltage source may furnish 250 volts at 55 milliamperes.

*Oscillator 8, 9*

| | |
|---|---|
| Tube 8 | EF 42 |
| Tube 9 | EF 42 |
| $R_{10}$ | 5.6 kilohms |
| $R_{11}$ | 5.6 kilohms |
| $R_{12}$ | 5.6 kilohms |
| $R_{14}$ | 560 ohms |
| $R_{15}$ | 27 ohms |
| $R_{16}$ | 27 ohms |
| $R_{18}$ | 1 megohm |
| $R_{21}$ | 33 kilohms |
| $R_{23}$ | 54 kilohms |
| $R_{25}$ | 2.5 kilohms |
| $R_{26}$ | 10 kilohms |
| $R_{27}$ | 2.7 kilohms |
| $R_{28}$ | lamp 220 volts, 10 watts |
| $C_{17}$ | 0.1 microfarad |
| $C_{20}$ | 8 microfarads (electrolytic) |
| $C_{22}$ | 0.1 microfarad |
| $C_{24}$ | 0.1 microfarad |

*Electrometer tube circuit*

| | |
|---|---|
| Tube 47 | DL 92 |
| $R_{46}$ | 1 megohm |
| $R_{48}$ | 120 kilohms |
| $R_{52}$ | 15 kilohms (wire resistance) |
| $R_{53}$ | 15 kilohms (wire resistance) |
| $R_{54}$ | 150 ohms (wire resistance) |
| $R_{55}$ | 220 ohms (wire resistance) |
| $R_{56}$ | 39 kilohms |

*Band pass filter*

| | |
|---|---|
| $R_{38}$ | 470 kilohms |
| $R_{39}$ | 330 kilohms |
| $R_{40}$ | 100 kilohms |
| $R_{41}$ | 82 kilohms |
| $R_{44}$ | 180 kilohms |
| $C_{42}$ | 0.1 microfarad |
| $C_{43}$ | 0.25 microfarad |
| $C_{45}$ | 1 microfarad |

It is to be understood that the invention is not limited to the details disclosed but includes all such variations and modifications as fall within the spirit of the invention and the scope of the appended claims.

What is claimed is:

1. A circuit arrangement for automatic correction of the output voltage of an oscillator comprising a discriminator circuit adapted to provide a control voltage for controlling the output voltage of said oscillator, means for supplying said oscillator output voltage to said discriminator circuit, means for supplying a control oscillation to said discriminator circuit, a smoothing filter having an output capacitor, an interrupter interposed between said discriminator circuit and said output capactor adapted to be opened at given intervals of time in order to maintain a momentary oscillatory frequency at the output of said oscillator irrespective of the variations of the control voltage provided by said discriminator circuit, means coupled to said oscillator for controlling the frequency thereof, an electron discharge device having an anode, a cathode and a control grid interposed between said smoothing filter and said frequency controlling means, said electron discharge device having a maximum negative grid current of $10^{-10}$ amperes, said output capacitor being connected to said control grid, and an anode-cathode discharge path for said discharge device comprising a variable resistor varying in accordance with the magnitude of said control voltage, said variable resistor being connected in parallel with said frequency controlling means.

2. A circuit arrangement for automatic correction of the output voltage of an oscillator comprisng a discriminator circuit adapted to provide a control voltage for controlling the output voltage of said oscillator, means for supplying said oscillator output voltage to said discriminator circuit, means for supplying a control oscillation for said discriminator circuit, a smoothing filter having an output capacitor, an interrupter interposed between said discriminator circuit and said output capacitor adapted to be opened at given intervals of time in order to maintain a momentary oscillatory frequency at the output of said oscillator irrespective of the variations of the control voltage provided by said discriminator circuit, means coupled to said oscillator for controlling the frequency thereof, an electron discharge device having an anode, a cathode, a control grid and a screen grid interposed between said smoothing filter and said frequency controlling means, said electron discharge device having a maximum negative grid current of $10^{-10}$ amperes, said output capacitor being connected to said control grid, a source of anode supply voltage, potentiometer means connected between said source, said screen grid, said anode and said cathode for maintaining a maximum anode voltage and a maximum screen grid voltage of 15 volts, and an anode-cathode discharge path for said discharge device comprising a variable resistor varying in accordance with the magnitude of said control voltage, said variable resistor being connected in parallel with said frequency controlling means.

3. A circuit arrangement as claimed in claim 2, wherein said discriminator circuit comprises phase detecting means controlled by said oscillator output voltage and said control oscillation.

References Cited in the file of this patent

UNITED STATES PATENTS

| | | |
|---|---|---|
| 2,437,609 | Mayle | Mar. 9, 1948 |
| 2,479,817 | Curran | Aug. 23, 1949 |
| 2,510,095 | Frankel | June 6, 1950 |
| 2,567,286 | Hugenholtz | Sept. 11, 1951 |
| 2,715,660 | Colchester | Aug. 16, 1955 |